Patented Aug. 10, 1954

2,686,125

UNITED STATES PATENT OFFICE 2,686,125

MATURING FLOUR WITH SOLID PERHYDRATE

Paul H. Margulies, Buffalo, N. Y., assignor to Buffalo Electro-Chemical Company, Inc., Tonawanda, N. Y.

No Drawing. Application July 13, 1949, Serial No. 104,601

5 Claims. (Cl. 99—91)

The present invention relates to a method of maturing flour and particularly to a flour maturing process employing solid perhydrate compounds below a critical size classification.

The baking trade as it is constituted today does not employ wheat flour as initially produced by usual flour milling processes but demands that such flour be modified in two important respects before it is acceptable to the trade. First, the yellowish color of the flour must be eliminated and changed to a rather bright white color by means of a bleaching process and, second, the baking characteristics of the flour must be improved by what is termed a "maturing process."

Although prolonged storage of the flour improves both the color and the baking characteristics, such storage is impractical by reason of the extremely large quantities of material involved and period of time required to obtain the desired improvement by storage alone.

It is thought that in the maturing of flour, the proteolytic effects of certain flour enzymes, acting upon the gluten fraction of the wheat flour, and the effects of reducing substances, also present in the flour, are either prevented or modified. If some maturing action is not effected upon the flour, prior to its use in the preparation of dough, the enzymes and reducing substances present therein attack the gluten fraction during dough formation, resulting in the production of unelastic doughs which do not rise properly. As a consequence, when such doughs are fermented and baked to yield baked goods or bread, products of unsatisfactory volume and crumb structure result.

It has become standard practice, therefore, to accelerate both the bleaching and the maturing operation by the employment of chemicals classed either as bleachants or as maturants with the production of a properly bleached and aged or matured flour in a matter of a few hours. Both the bleaching operation and the maturing operation require the employment of oxidizing agents to effect the result desired. It is, therefore, not surprising to find that certain oxidizing agents, when reacted with flour, will give both a bleaching and a maturing effect. However, the chemical mechanism of oxidative bleaching of the carotenoid flour pigments and of oxidative inactivation of proteolytic enzymes and reducing substances differ considerably from each other. For this reason, a given oxidizing agent producing a satisfactory bleaching effect on the flour, when used in the amounts required to give this effect, will not necessarily produce an equally satisfactory maturing effect and vice versa. For this reason, modern mill practice employs two distinct steps and two different oxidizing agents in the post-milling treatment of flour, one to produce the desired degree of bleach without noticeably affecting the baking characteristics of the flour, and the other to produce the desired maturing effect without appreciably contributing to the degree of bleaching obtained by the oxidizing agent employed in the bleaching step proper.

Although many oxidizing agents may be employed for flour bleaching, benzoyl peroxide is presently almost universally employed for this purpose. The benzoyl peroxide is normally added to the flour as a mixture with inorganic salt extenders, the mixture containing from about 20 to 30% of benzoyl peroxide, the residue being inorganic salt extender. This composition is metered into the flour stream and distributed through the bulk of the flour by means of agitators which are conventional in the trade. Ordinarily about 100 to 300 parts per million of the benzoyl peroxide composition are added to the flour and agitated therewith. A satisfactory bleach is obtained within 10 to 24 hours and this particular bleaching agent does not appreciably change the baking characteristics of the original flour but merely produces a bleaching effect therein.

The oxidizing agents currently employed by the miller for maturing the flour comprise either gaseous oxidizing agents which mature the flour upon admixture therewith or solid oxidizing agents whose maturing effect is developed during the process of preparing dough from the flour.

The gaseous oxidizing agents currently used by the miller for maturing purposes comprise chlorine, chlorine dioxide and nitrogen trichloride. Use of the latter compound, having been very great up to the present, is being discontinued because of possible formation of toxic reaction products. Chlorine and chlorine dioxide are considered physiologically safe to use, although other characteristics of these gases require great care in their application. The unmatured flour is normally permitted to fall through a closed chamber from a set of vibrating screens through an atmosphere of the gaseous maturing agent. During this passage through the gaseous atmosphere of the maturing agent, the flour absorbs the required quantity of the oxidizing agent for the purposes of maturation. The quantity of active gas so used is quite small and is generally in the range from about 5 to 200 parts per million. The maturing effect is obtained rapidly and the dry flour is matured in the dry state.

The amount of gaseous oxidizing agent used as a maturing agent being so small, it must be metered accurately with respect to the quantity of flour treated; if used in quantities in excess of those tolerated by the gluten fraction of the flour, the gluten is overoxidized and the resultant flour possesses completely unsatisfactory dough characteristics, making production of baked goods of proper texture impossible. Amounts of gaseous oxidizing agents useful for maturing the flour, will not produce a noticeable color change in the flour; a bleaching effect would be obtained only with such amounts of gaseous oxidizing agents as to cause overoxidation of the gluten fraction of the flour with attendant serious baking troubles.

Solid maturing agents comprise the bromates, iodates and persulfates, among others. They are added to the flour in ground form but appear to exert no effect whatever upon the flour until water is added thereto in the process of preparing the dough. The use of solid maturing agents has not been as prevalent heretofore as the employment of the gaseous maturing agents described above.

The prior commercially operable processes for bleaching and maturing dry flour therefore fall into two groups: (1) bleaching processes employing solid, oil-soluble peroxides which may be operated so as to produce no noticeable maturing effects and (2) maturing processes employing gaseous oxidizing agents, the action of which may be controlled so as to obtain therefrom no practical bleaching effects.

The present invention does not fall within either of the above categories since it is a maturing process carried out upon dry flour in the dry state, wherein solid, water-soluble perhydrates are employed as maturing agents so as to obtain the maturing effect in the dry flour itself.

This maturing effect is obtained upon the dry flour by mixing therewith perhydrates, that is, substances which may be thought of as containing hydrogen peroxide of crystallization, of an extreme fineness of subdivision and falling within a size classification of less than 20 microns and preferably on the order of 10 microns.

Although it has been known for many years that hydrogen peroxide possesses the property of producing maturing effects in wheat flour, it cannot be used upon dry flour without obtaining an objectionable wetting of the flour and, therefore, the material has not had any commercial acceptance as a maturing agent for dry flour.

In accordance with the principles of the present invention, the hydrogen peroxide may be used to obtain a true maturing effect without there being any wetting of the flour. Such a result is obtained in this invention by adding to the dry flour a perhydrate in an extreme state of subdivsion wherein the particle size is less than 20 microns and in the range of about 10 microns.

The perhydrates employed and which have been found suitable are those of either organic or inorganic compounds which are solid at room temperature and which may, therefore, be subdivided by grinding as, for instance, urea peroxide, sodium carbonate perhydrate, sodium pyrophosphate perhydrate, sodium metaborate perhydrate, sodium sulfate perhydrate, asparagin peroxide, succinimide peroxide and many others.

For practical reasons, sodium carbonate perhydrate is the preferred perhydrate and is the one used in the examples illustrated herein. The invention however is not restricted thereto since any solid perhydrate is operable.

The particular perhydrate employed apepars to be immaterial. The important factor is that it be reduced to an extremely fine powder such that each gram weight of the perhydrate should be subdivided to contain 10 million particles or more. It is believed that under this extreme state of subdivision, the perhydrate particle can, in effect, enter the voids between adjacent groups of flour particles and by reason of such contact give up the hydrogen peroxide to the flour and effectively mature the adjacent particles thereof. That is to say, it is important to have available a sufficient number of reactive particles and not only a sufficient weight in order to obtain useful results. Thus $\frac{1}{10}$ of a gram of a perhydrate, even if known to be able to modify 1 kilogram of dry flour, will not, if introduced as a single crystal, have any effect beyond the relatively few flour particles in direct contact with it. However, upon grinding the $\frac{1}{10}$ gram of perhydrate to the range, say 0 to 10 microns, the whole kilogram of dry flour will be matured.

The novel maturing effects produced on dry flour by solid perhydrates in the form of powders of a size classification less than 20 microns and generally in the range 0 to 10 microns, are obtained only with the perhydrates and not with other known solid maturing agents, such as persulfate, bromate or iodate which mature in the wet state. However, in the case of the perhydrate, amounts thereof by weight ranging from 50 to about 500 parts per million will suffice to mature the usual type of wheat flour in the dry state. The blending may be performed by the employment of any of the usual types of blending equipment. The blended or dosed flour is then kept at room temperature in contact with the perhydrate for from 2 to 24 hours or until a negative test for peroxide with a suitable reagent indicates that the maturing reaction has been completed and the perhydrate used up.

The following examples are given merely by way of illustration and are not deemed to be limitative of the invention as it will be understood that there are many variations possible since flour varies considerably in composition and gluten content, depending upon the origin of the wheat from which it is produced, the time of harvest and the meteorological conditions existing during the growing period.

*Example 1*

100 parts per million of sodium carbonate perhydrate powder classified by air elutriation to a size range of 0 to 10 microns was added to clear flour and blended uniformly therewith. Tests for the presence of hydrogen peroxide were made at periodic intervals and at the end of three hours showed negative. Dough was prepared from the so treated flour and the standard baking test [1] showed great improvement in volume, texture and crumb structure of the baked product over a product baked from the untreated sample which produced a sticky and undesirable dough yielding baked goods of poor quality.

*Example 2*

500 parts per million of sodium carbonate per-

---
[1] As set forth in the 5th edition of "Cereal Laboratory Methods," 1947, American Association Cereal Chemists, p. 139.

hydrate powder comminuted to —200 mesh (74 microns) was added to a clear flour of the type used in Example 1. The test for residual hydrogen peroxide was still slightly positive after 48 hours. The standard baking test showed no maturing effects.

The above examples show strikingly the function of the particle size of the perhydrate in effecting a maturing reaction in the dry flour. Whereas 500 parts per million of —200 mesh perhydrate showed no maturing of the flour, 100 parts per million of a 0 to 10 micron size perhydrate gave excellent results. Maturing effects become apparent upon classification of the fine perhydrate to —20 microns and preferably 0 to 10 microns. In general the quantity of perhydrate employed will be from 5 to 250 parts per million parts of flour and generally less than 500 parts per million of flour.

The same type of maturing results are obtained by employing any of the solid perhydrates in particle size of —10 microns, such as sodium pyrophosphate perhydrate, urea peroxide, sodium metaborate perhydrate and, in fact, the reaction is general for all compounds containing hydrogen peroxide of crystallization since it is believed that this is the material which functions in this reaction.

What is claimed is:

1. The process of maturing dry flour in the dry state which comprises mixing with the dry flour a solid perhydrate of a particle size less than 20 microns.

2. The process of maturing dry flour which comprises mixing with the dry flour a solid perhydrate subdivided to contain not less than about $10^7$ particles per gram and permitting the mixture to stand prior to the manufacture of dough therefrom until all the peroxide has been consumed.

3. The process of maturing dry flour which comprises mixing with the dry flour a solid perhydrate of a particle size less than 20 microns, the amount of perhydrate being less than 500 parts by weight for each million parts of flour.

4. The process of maturing dry flour which comprises mixing with the dry flour a solid perhydrate of a particle size less than 20 microns, the amount of perhydrate being between 5 and 250 parts by weight per each million parts of flour.

5. The process of maturing dry flour which comprises mixing with the dry flour a solid perhydrate of a particle size less than 20 microns, the amount of perhydrate being sufficient to produce the desired maturing effect in the flour.

References Cited in the file of this patent

FOREIGN PATENTS

| Number | Country | Date |
|---|---|---|
| 213,268 | Great Britain | July 20, 1925 |